United States Patent
Ogg

(10) Patent No.: US 7,613,639 B1
(45) Date of Patent: *Nov. 3, 2009

(54) SECURE AND RECOVERABLE DATABASE FOR ON-LINE VALUE-BEARING ITEM SYSTEM

(75) Inventor: Craig L. Ogg, Long Beach, CA (US)

(73) Assignee: Stamps.com, Santa Monica, CA (US)

( * ) Notice: Subject to any disclaimer, the term of this patent is extended or adjusted under 35 U.S.C. 154(b) by 1324 days.

This patent is subject to a terminal disclaimer.

(21) Appl. No.: 09/690,796

(22) Filed: Oct. 17, 2000

Related U.S. Application Data

(60) Provisional application No. 60/160,112, filed on Oct. 18, 1999, provisional application No. 60/160,491, filed on Oct. 20, 1999, provisional application No. 60/160,703, filed on Oct. 20, 1999, provisional application No. 60/160,563, filed on Oct. 20, 1999.

(51) Int. Cl.
*G06Q 20/00* (2006.01)
*H04L 26/06* (2006.01)

(52) U.S. Cl. .............. 705/35; 705/26; 705/44

(58) Field of Classification Search ............. 705/60–62, 705/67, 401, 404, 405, 35, 52; 707/104.1; 713/184
See application file for complete search history.

(56) References Cited

U.S. PATENT DOCUMENTS

| | | |
|---|---|---|
| 4,447,890 A | 5/1984 | Duwel et al. |
| 4,725,718 A | 2/1988 | Sansone et al. ............ 235/495 |
| 4,743,747 A | 5/1988 | Fougere et al. ............ 235/494 |
| 4,757,537 A | 7/1988 | Edelmann et al. |
| 4,775,246 A | 10/1988 | Edelmann et al. |
| 4,802,218 A | 1/1989 | Wright et al. ............ 380/23 |
| 4,812,994 A | 3/1989 | Taylor et al. ........... 364/464.02 |
| 4,831,555 A | 5/1989 | Sansone et al. |
| 4,837,702 A | 6/1989 | Obrea |

(Continued)

FOREIGN PATENT DOCUMENTS

EP 0 360 225 A2 3/1990

(Continued)

OTHER PUBLICATIONS

United States Postal Service, "Information Based Indicia Program Postal Security Device Specification," XP-002137734, Entire Document (21 Sheets), Jun. 1996.

(Continued)

*Primary Examiner*—Evens J Augustin
(74) *Attorney, Agent, or Firm*—Christie, Parker & Hale, LLP.

(57) ABSTRACT

An on-line value bearing item (VBI) printing system that includes one or more cryptographic modules and a secure database is disclosed. The secure database includes account balances and other information for all of the on-line value-bearing item system customers and is capable of preventing access by unauthorized users. Also, a secure communication network is in operation to prevent unauthorized access to the users' data stored in the database.

A plurality of subsystems located on the server system side of the on-line VBI system provide services related to purchasing, accounting, and printing of VBI. In addition to the secure database, the server system includes one or more cryptographic modules for authenticating, processing value for the VBI, and generating indicia data for the plurality of users.

18 Claims, 8 Drawing Sheets

U.S. PATENT DOCUMENTS

| | | | |
|---|---|---|---|
| 4,853,865 A | 8/1989 | Sansone et al. ........ 364/464.02 |
| 4,900,903 A | 2/1990 | Wright et al. |
| 4,900,904 A | 2/1990 | Wright et al. |
| 4,907,268 A * | 3/1990 | Bosen et al. ................ 713/193 |
| 4,908,770 A | 3/1990 | Breault et al. |
| 4,933,849 A | 6/1990 | Connell et al. .............. 364/400 |
| 4,935,961 A | 6/1990 | Gargiulo et al. .............. 380/21 |
| 4,949,381 A | 8/1990 | Pastor |
| 4,980,542 A | 12/1990 | Jackson et al. |
| 5,048,085 A | 9/1991 | Abraham et al. |
| 5,058,008 A | 10/1991 | Schumacher |
| 5,060,263 A * | 10/1991 | Bosen et al. ................ 713/184 |
| 5,075,865 A | 12/1991 | Kawamura et al. |
| 5,111,030 A | 5/1992 | Brasington et al. |
| 5,142,577 A | 8/1992 | Pastor ......................... 380/21 |
| 5,181,245 A | 1/1993 | Jones |
| 5,241,483 A | 8/1993 | Porret et al. |
| 5,265,221 A | 11/1993 | Miller |
| 5,319,562 A | 6/1994 | Whitehouse |
| 5,325,519 A | 6/1994 | Long et al. |
| 5,341,505 A | 8/1994 | Whitehouse ................. 395/800 |
| 5,377,268 A | 12/1994 | Hunter |
| 5,379,391 A | 1/1995 | Belsan et al. |
| 5,384,886 A | 1/1995 | Rourke |
| 5,390,251 A | 2/1995 | Pastor et al. |
| 5,448,641 A | 9/1995 | Pintsov et al. |
| 5,454,038 A | 9/1995 | Cordery et al. |
| 5,471,925 A | 12/1995 | Heinrich et al. |
| 5,495,411 A * | 2/1996 | Ananda ........................ 705/32 |
| 5,548,645 A * | 8/1996 | Ananda ........................ 705/52 |
| 5,561,795 A | 10/1996 | Sarkar |
| 5,570,465 A | 10/1996 | Tsakanikas |
| 5,598,477 A | 1/1997 | Berson |
| 5,600,562 A | 2/1997 | Guenther |
| 5,621,797 A | 4/1997 | Rosen |
| 5,655,023 A | 8/1997 | Cordery et al. |
| 5,659,616 A | 8/1997 | Sudia |
| 5,659,798 A * | 8/1997 | Blumrich et al. .............. 710/26 |
| 5,666,421 A | 9/1997 | Pastor et al. ................... 380/51 |
| 5,668,897 A | 9/1997 | Stolfo |
| 5,671,146 A | 9/1997 | Windel et al. |
| 5,680,629 A | 10/1997 | Slayden et al. |
| 5,684,951 A | 11/1997 | Goldman et al. |
| 5,715,314 A | 2/1998 | Payne et al. |
| 5,729,734 A | 3/1998 | Parker et al. |
| 5,742,683 A | 4/1998 | Lee et al. |
| 5,768,132 A | 6/1998 | Cordery et al. |
| 5,781,438 A | 7/1998 | Lee et al. |
| 5,781,634 A | 7/1998 | Cordery et al. |
| 5,793,867 A | 8/1998 | Cordery et al. ................. 380/4 |
| 5,796,841 A | 8/1998 | Cordery et al. |
| 5,801,364 A | 9/1998 | Kara et al. |
| 5,801,944 A | 9/1998 | Kara ........................ 364/464.2 |
| 5,809,140 A * | 9/1998 | Rubin et al. ................ 380/279 |
| 5,812,990 A | 9/1998 | Ryan, Jr. et al. |
| 5,812,991 A | 9/1998 | Kara |
| 5,815,577 A | 9/1998 | Clark |
| 5,819,240 A | 10/1998 | Kara |
| 5,822,739 A | 10/1998 | Kara |
| 5,825,893 A | 10/1998 | Kara .......................... 380/51 |
| 5,867,578 A | 2/1999 | Brickell et al. |
| 5,871,288 A | 2/1999 | Ryan, Jr. et al. |
| 5,917,924 A | 6/1999 | Herbert |
| 5,918,234 A | 6/1999 | Shah et al. .................... 707/204 |
| 5,923,756 A * | 7/1999 | Shambroom ................ 713/156 |
| 5,930,796 A | 7/1999 | Pierce et al. |
| 5,940,383 A | 8/1999 | Willkie |
| 5,953,427 A | 9/1999 | Cordery et al. ............... 380/51 |
| 5,956,404 A | 9/1999 | Schneier et al. |
| 5,960,411 A | 9/1999 | Hartman et al. |
| 5,961,601 A * | 10/1999 | Iyengar ....................... 709/229 |
| 5,978,484 A | 11/1999 | Apperson et al. |
| 5,983,227 A | 11/1999 | Nazem et al. |
| 5,987,441 A | 11/1999 | Lee et al. .................... 705/401 |
| 5,988,897 A | 11/1999 | Pierce et al. ................... 400/61 |
| 6,005,945 A | 12/1999 | Whitehouse ................. 380/51 |
| 6,009,417 A | 12/1999 | Brookner et al. |
| 6,010,156 A | 1/2000 | Block |
| 6,026,385 A | 2/2000 | Harvey et al. ................ 705/408 |
| 6,049,671 A | 4/2000 | Slivka et al. |
| 6,058,384 A | 5/2000 | Pierce et al. |
| 6,061,671 A | 5/2000 | Baker et al. .................. 705/404 |
| 6,064,993 A | 5/2000 | Ryan, Jr. ..................... 705/403 |
| 6,065,117 A | 5/2000 | White |
| 6,070,150 A | 5/2000 | Remington et al. |
| 6,081,810 A * | 6/2000 | Rosenzweig et al. ...... 707/104.1 |
| 6,098,058 A | 8/2000 | Gravell et al. |
| 6,105,063 A | 8/2000 | Hayes, Jr. |
| 6,134,582 A | 10/2000 | Kennedy |
| 6,151,591 A * | 11/2000 | Pierce et al. ................. 705/401 |
| 6,161,139 A | 12/2000 | Win et al. |
| 6,164,528 A | 12/2000 | Hills et al. |
| 6,166,729 A | 12/2000 | Acosta et al. |
| 6,173,209 B1 | 1/2001 | Laval et al. |
| 6,173,274 B1 | 1/2001 | Ryan, Jr. |
| 6,192,349 B1 | 2/2001 | Husemann et al. |
| 6,223,166 B1 | 4/2001 | Kay |
| 6,226,752 B1 | 5/2001 | Gupta et al. |
| 6,233,565 B1 * | 5/2001 | Lewis et al. ................... 705/35 |
| 6,233,568 B1 | 5/2001 | Kara |
| 6,249,777 B1 | 6/2001 | Kara et al. |
| 6,275,824 B1 | 8/2001 | O'Flaherty et al. |
| 6,286,098 B1 | 9/2001 | Wenig et al. |
| 6,324,523 B1 | 11/2001 | Killeen, Jr. et al. |
| 6,341,274 B1 | 1/2002 | Leon |
| 6,353,926 B1 | 3/2002 | Parthesarathy et al. |
| 6,367,013 B1 | 4/2002 | Bisbee et al. |
| 6,381,589 B1 | 4/2002 | Leon |
| 6,385,654 B1 | 5/2002 | Tanaka |
| 6,385,731 B2 | 5/2002 | Ananda |
| 6,408,286 B1 | 6/2002 | Heiden |
| 6,415,983 B1 | 7/2002 | Ulvr et al. |
| 6,424,954 B1 | 7/2002 | Leon |
| 6,427,021 B1 | 7/2002 | Fischer et al. |
| 6,434,238 B1 | 8/2002 | Chaum et al. |
| 6,446,204 B1 | 9/2002 | Pang et al. |
| 6,466,921 B1 * | 10/2002 | Cordery et al. ................ 705/60 |
| 6,473,743 B1 | 10/2002 | Ryan, Jr. |
| 6,496,932 B1 | 12/2002 | Trieger |
| 6,505,773 B1 | 1/2003 | Palmer et al. |
| 6,546,377 B1 | 4/2003 | Gravell et al. |
| 6,567,794 B1 | 5/2003 | Cordery et al. |
| 6,584,101 B2 * | 6/2003 | Hagglund et al. ........... 370/389 |
| 6,587,880 B1 | 7/2003 | Saigo et al. |
| 6,636,983 B1 | 10/2003 | Levi |
| 6,957,196 B1 * | 10/2005 | Cordery et al. ................ 705/60 |
| 6,972,859 B1 | 12/2005 | Patton et al. |
| 2001/0034716 A1 | 10/2001 | Goodwin |
| 2001/0037320 A1 | 11/2001 | Allport et al. |
| 2001/0055388 A1 | 12/2001 | Kaliski, Jr. |
| 2002/0023057 A1 | 2/2002 | Goodwin et al. |
| 2002/0046193 A1 | 4/2002 | Bator et al. |
| 2002/0095383 A1 | 7/2002 | Mengin et al. |
| 2002/0178354 A1* | 11/2002 | Ogg et al. .................... 713/155 |
| 2003/0078893 A1 | 4/2003 | Shah et al. |
| 2003/0130954 A1 | 7/2003 | Carr et al. |
| 2005/0114712 A1 | 5/2005 | Devine et al. |

FOREIGN PATENT DOCUMENTS

| | | |
|---|---|---|
| EP | 0 576 113 A2 | 12/1993 |
| EP | 0 604 146 A3 | 6/1994 |
| EP | 0 604 148 A3 | 6/1994 |
| EP | 0 647 925 A2 | 4/1995 |

| | | |
|---|---|---|
| EP | 0 780 809 A2 | 6/1997 |
| EP | 0 604 146 B1 | 11/1997 |
| EP | 0 840 258 | 5/1998 |
| EP | 0 854 448 A2 | 7/1998 |
| EP | 0 892 367 A2 | 1/1999 |
| EP | 0 927 957 A2 | 7/1999 |
| EP | 0 927 958 | 7/1999 |
| EP | 0 927 963 | 7/1999 |
| EP | 0 948 158 | 10/1999 |
| GB | 2318486 A | 4/1998 |
| WO | WO94/27258 | 11/1994 |
| WO | WO 98/13790 A1 | 4/1998 |
| WO | WO98/57302 | 12/1998 |
| WO | WO 98/57460 A1 | 12/1998 |
| WO | WO99/18514 | 4/1999 |
| WO | WO 00/19382 A1 | 4/2000 |
| WO | WO 00/70503 A1 | 11/2000 |
| WO | WO 01/50227 A2 | 7/2001 |

OTHER PUBLICATIONS

International Search Report, International Application No. PCT/US00/41203, Feb. 2001.

Pastor, Jose; CRYPTOPOST™—A Cryptographic Application to Mail Processing; Journal of Cryptology; 1991; 137-146pp.; vol. 3; No. 2; International Association for Cryptologic , Research.

The United States Postal Service (USPS) Engineering Center; Information Based Indicia Program (IBIP) Indicium Specification; Jun. 13, 1996; 22pp.

The United States Postal Service (USPS); Information-Based Indicia Program (IBIP): Performance Criteria for Information-Based Indicia and Security Architecture for Closed IBI Postage Metering Systems (PCIBI-C); Jan. 12, 1999; 49pp.

The United States Postal Service (USPS); Information-Based Indicia Program (IBIP); Performance Criteria for Information-Based Indicia and Security Architecture for Open IBI Postage Evidencing Systems (PCIBI-O); Jun. 25, 1999; 76pp.

Tygar, J.D. and Yee, Bennet; Cryptography: It's Not Just for *Electronic* Mail Anymore; School of Computer Science; Mar. 1, 1993; 1-21pp.; Carnegie Mellon University, Pittsburg, PA, USA.

Tygar, J.D. And Yee, Bennet; Dyad: A System for Using Physically Secure Coprocessors; School Computer Science; May 4, 1991; 1-36pp.; Carnegie Mellon University, Pittsburg, PA, USA.

U.S. Appl. No. 09/585,025, filed Jun. 1, 2000, "Online Value Bearing Item Printing", 125 pp.

U.S. Appl. No. 09/688,451, filed Oct. 16, 2000, Auditing Method and System for an On-Line Value-Bearing Item Printing System, 105 pp.

U.S. Appl. No. 09/688,452, filed Oct. 16, 2000, "Role Assignments in a Cryptographic Module for Secure Processing of Value-Bearing Items", 105pp.

U.S. Appl. No. 09/688,456, filed Oct. 16, 2000, "Cryptographic Module for Secure Processing of Value- Bearing Items", 109pp.

U.S. Appl. No. 09/690,066, filed Oct. 16, 2000, "Cryptographic Module for Secure Processing of Value-Bearing Items", 121pp.

U.S..Appl. No. 09/690,083, filed Oct. 16, 2000, "Cryptographic Module for Secure Processing of Value-Bearing Items", 109pp.

U.S. Appl. No. 09/690,243, filed Oct. 17, 2000, "Method and Apparatus for On-Line Value-Bearing Item System", 66pp.

U.S. Appl. No. 09/692,746, filed Oct. 18, 2000, "Method and Apparatus for Digitally Signing an Advertisement Area Next to a Value-Bearing Item", 61pp.

U.S. Appl. No. 09/692,829, filed Oct. 18, 2000, "Postal System Intranet and Commerce Processing for On-Line Value-Bearing System", 179pp.

U.S. Appl. No. 09/788,069, filed Feb. 16, 2001, "On-Line Value-Bearing Indicium Printing Using DSA", 43pp.

U.S. Appl. No. 10/083,236, filed Feb. 26, 2002, "Secured Centralized Public Key Infrastructure", 101pp.

Fickel, Louise, "Know Your Customer," 100 Leaders for the Next Millennium, CIO Magazine, Aug. 15, 1999, pp. 1-11.

Sagner, James S., "Protecting Organizations from Electronic-Transaction Fraud", Healthcare Financial Management; Westchester; Feb. 1995.

Ratcliffe, Mitch, "Ever feel you're being watched? You will."; *Digital Media*; May 16, 1994; v3, n12, 3pgs.

USPS Publication No. 25, "Designing Letter Mail", Aug. 1995.

\* cited by examiner

SECURE AND RECOVERABLE DATABASE FOR ON-LINE VALUE-BEARING ITEM SYSTEM

CROSS-REFERENCE TO RELATED APPLICATIONS

This patent application claims the benefit of the filing date of U.S. Provisional Patent Application Ser. Nos. 60/160,112, filed Oct. 18, 1999 and entitled "INTERNET POSTAL METERING SYSTEM"; 60/160,491, filed Oct. 20, 1999 and entitled "SECURE AND RECOVERABLE DATABASE FOR ON-LINE POSTAGE SYSTEM"; 60/160,703, filed Oct. 20, 1999 and entitled "SCALABLE ON-LINE POSTAGE SYSTEM"; 60/160,563, filed Oct. 20, 1999 and entitled "SERVER ARCHITECTURE FOR ON-LINE POSTAGE SYSTEM," the entire contents of which are hereby expressly incorporated by reference.

FIELD OF THE INVENTION

The present invention relates to secure printing of value-bearing items (VBI) preferably, such as postage, tickets, and coupons. More specifically, the invention relates to a secure and recoverable on-line system for validating and printing VBI in a Wide Area Network (WAN) environment.

BACKGROUND OF THE INVENTION

A considerable percentage of the United States Postal Service (USPS) revenue is from metered postage. Metered postage is generated by utilizing postage meters that print a special mark, also known as postal indicia, on mail pieces. Generally, printing postage and any VBI can be carried out by using mechanical meters or computer-based systems.

With respect to computer-based postage processing systems, the USPS under the Information-Based Indicia Program (IBIP) has published specifications for IBIP postage meters that identify a special purpose hardware device, known as a Postal Security Device (PSD) that is generally located at a user's site. The Device (PSD) that is generally located at a user's site. The PSD, in conjunction with the user's personal computer and printer, functions as the IBIP postage meter. The USPS has published a number of documents describing the PSD specifications, the indicia specifications and other related and relevant information. There are also security standards for printing other types of VBIs, such as coupons, tickets, gift certificates, currency, voucher and the like.

A significant drawback of existing hardware-based systems is that a new PSD must be locally provided to each new user, which involves significant cost. Furthermore, if the additional PSD breaks down, service calls must be made to the user location. In light of the drawbacks in hardware-based postage metering systems, a software-based system has been developed that does not require specialized hardware for each user. The software-based system meets the IBIP specifications for a PSD, using a centralized server-based implementation of PSDs utilizing one or more cryptographic modules. The system also includes a database for all users' information. The software-based system, however, has brought about new challenges.

The system should also be able to handle minor and catastrophic database failures without impacting the integrity of the on-line VBI system and provide for recovery of the database to minimize or eliminate the loss of data. In a hardware-based system, security is generally handled by the local hardware piece, that is unique to each user and includes a cryptographic module that encrypts that user's information. System recovery can generally be handled by replacing the corrupted local hardware pieces for each user that stores that user's information, however, data specific to that user may be lost. Nevertheless, for a software-based system, the system need to be configured to handle such database failures without sacrificing a major data loss and system security.

Therefore, there is a need for a new method and apparatus for implementation of an IBIP postage meter and other value-bearing items over a WAN that does not require the special purpose hardware device at the user site. Furthermore, there is a need for a secure and recoverable database in an on-line VBI system that is capable of preventing unauthorized access and handling minor and catastrophic database failures without impacting the integrity of the system.

SUMMARY OF THE INVENTION

In accordance with the present invention, a secure database in an on-line VBI system has been designed that has the ability to recover data in case of a database failure. The secure database includes account balances and other information for all of the on-line value-bearing item system customers and is capable of preventing access by unauthorized users. Also, a secure communication network is in operation to prevent unauthorized access to the users' data stored in the database. Additionally, the system is capable of handling minor and catastrophic database failures without impacting the integrity of the on-line value-bearing item system. The system is designed to provide for recovery of the database and minimize or eliminate the loss of data.

The on-line value-bearing item system is designed to prevent unauthorized electronic access to a database subsystem. One level of security is a firewall, which should prevent almost all unauthorized access to the database subsystem. Another level of security is achieved by protecting the database subsystem by a postal server subsystem. Preferably, the postal server subsystem controls all communications with the database subsystem by executing an authentication algorithm to prevent unauthorized access. Another level of security is achieved by encrypting preferably, all communications between the client and the postal server subsystem. The encryption-decryption function is employed using commonly known algorithms, such as, Rivest, Shamir and Adleman ("RSA") public key encryption, DES, Triple-DES, Pseudo-random number generation, and the like algorithms. Additionally, DSA signature, and SHA-1 hashing algorithms may be used to digitally sign a postage indicium or other VBI indicia.

Yet another measure of security is the interaction between a cryptographic module and the database subsystem whenever a PSD transaction is initiated. The cryptographic module and the database subsystem cross-verify the last PSD transaction before proceeding with the next PSD transaction. If the last transaction record in the cryptographic module and the database subsystem do not match, then the on-line value-bearing item system shuts down until the situation can be investigated. This verification process protects against attempts of unauthorized individuals to replace the database subsystem. The registers in the cryptographic modules are cryptographically protected to achieve another level of security.

Furthermore, the database subsystem is designed to allow for recovery of data in case of minor and catastrophic failures. The primary central database server in the database subsystem preferably has a live standby backup database server which mirrors its operation. In addition, the on-line value-bearing item system off-loads to a backup system, such as a backup tape drive or any other type of back up system, an audit log of all transactions several times every hour, preferably once every couple of minutes, to handle minor system failures.

Preferably, every day, a data backup occurs and a backup tape is stored off-site along with the transaction download. In case of catastrophic failure, e.g., when the central database is not usable due to earthquake or fire, the data backup tape is used with the transaction log and a cryptographic module to bring the system back to its original state.

One aspect of the present invention describes a secure on-line system for printing VBI. The system comprises a server system capable of communicating with the client system over a communication, a secure database remote from the users including information about the users; computer executable code for password authentication to prevent unauthorized access to the database; and a cryptographic module for authenticating any of the one or more users.

It is to be understood that the present invention is useful for printing not only postage, but any value bearing items, such as coupons, tickets, gift certificates, currency, voucher and the like.

BRIEF DESCRIPTION OF THE DRAWINGS

The objects, advantages and features of this invention will become more apparent from a consideration of the following detailed description and the drawings, in which.

DETAILED DESCRIPTION

Figure 1:
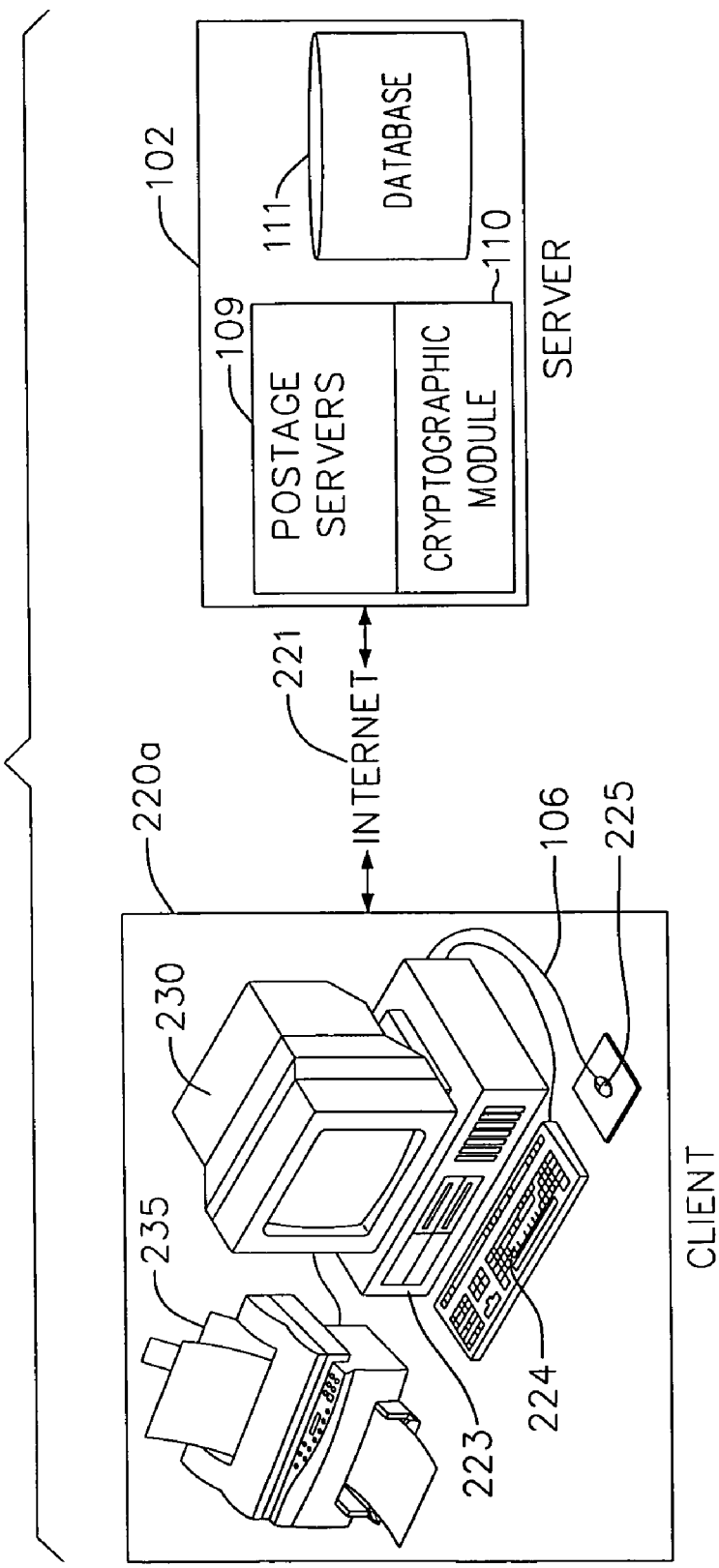
FIG. 1 is a block diagram for the client/server architecture of one embodiment of the present invention.

In one aspect, the system and method of the present invention prevent unauthorized electronic access to a database subsystem and secure customers' related data, among others. One level of security is achieved by protecting the database subsystem by a postal server subsystem. The postal server subsystem controls preferably, all communications with the database subsystem by executing an authentication algorithm to prevent unauthorized access. Another level of security is achieved by encrypting preferably, all communications between the client system and the postal server subsystem. The encryption-decryption function is employed using commonly known algorithms, such as, Rivest, Shamir and Adleman ("RSA") public key encryption, DES, Triple-DES, Pseudo-random number generation, and the like algorithms. Additionally, DSA signature, and SHA-1 hashing algorithms may be used to digitally sign a postage indicium.

Another measure of security is the interaction between a cryptographic module and the database subsystem whenever a PSD transaction (security device transaction) is initiated. The cryptographic module and the database subsystem cross-verify the last PSD transaction (security device transaction) before proceeding with the next PSD transaction. If the last transaction record in the cryptographic module and the database subsystem do not match, then the on-line VBI system shuts down until the situation can be investigated. This verification process protects against attempts of unauthorized individuals to replace the database subsystem. The registers in the cryptographic modules are cryptographically protected to achieve another level of security.

An exemplary on-line postage system is described in U.S. patent application Ser. No. 09/163,993 filed Sep. 15, 1998, the entire contents of which are hereby incorporated by reference herein. The on-line postage system includes an e protocol that operates in conjunction with the USPS requirements. The system utilizes on-line postage system software comprising user code that resides on a client system and controller code that resides on a server system. The on-line postage system allows a user to print a postal indicium at home, at the office, or any other desired place in a secure, convenient, inexpensive and fraud-free manner. The system comprises a user system electronically connected to a server system, which in turn is connected to a USPS system.

Each of the cryptographic modules may be available for use by any user. When a user requests a PSD service, one of the available modules is loaded with data belonging to the user's account and the transaction is performed. When a module is loaded with a user's data, that module becomes the user's PSD. The database record containing each user's PSD data is referred to as the "PSD package" (security device transaction data) After each PSD transaction is completed, the user's PSD package is updated and returned to a database external to the module. The database becomes an extension of the module's memory and stores not only the items specified by the IBIP for storage inside the PSD, but also the user's personal cryptographic keys and other security relevant data items (SRDI) and status information needed for continuous operation. Movement of this sensitive data between the modules and the database is secured to ensure that PSD packages could not be compromised.

In one embodiment, the server system is remotely located in a separate location from the client system. All communications between the client and the server are preferably accomplished via the Internet. FIG. 1 illustrates a remote client system 220a connected to a server system 102 via the Internet 221. The client system includes a processor unit 223, a monitor 230, printer port 106, a mouse 225, a printer 235, and a keyboard 224. Server system 102 includes Postage servers 109, Database 130, and cryptographic modules 110.

An increase in the number of servers within the server system 102 will not negatively impact the performance of the system, since the system design allows for scalability. The Server system 102 is designed in such a way that all of the business transactions are processed in the servers and not in the database. By locating the transaction processing in the servers, increases in the number of transactions can be easily handled by adding additional servers. Also, each transaction processed in the servers is stateless, meaning the application does not remember the specific hardware device the last transaction utilized. Because of this stateless transaction design, multiple servers can be added to each appropriate subsystem in order to handle increased loads.

Furthermore, each cryptographic module is a stateless device, meaning that a PSD package can be passed to any device because the application does not rely upon any information about what occurred with the previous PSD package. Therefore, multiple cryptographic modules can also be added to each appropriate subsystem in order to handle increased loads. A PSD package for each cryptographic module is a database record, stored in the server database, that includes information pertaining to one customer's service that would normally be protected inside a cryptographic module. The PSD package includes all data needed to restore the PSD to its last known state when it is next loaded into a cryptographic module. This includes the items that the IBIP specifications require to be stored inside the PSD, information required to return the PSD to a valid state when the record is reloaded from the database, and data needed for record security and administrative purposes.

In one embodiment, the items included in a PSD package include ascending and descending registers (the ascending register "AR" records the amount of postage that is dispensed or printed on each transaction and the descending register "DR" records the value or amount of postage that may be dispensed and decreases from an original or charged amount as postage is printed.), device ID, indicia key certificate serial number, licensing ZIP code, key token for the indicia signing key, the user secrets, key for encrypting user secrets, data and time of last transaction, the last challenge received from the client, the operational state of the PSD, expiration dates for keys, the passphrase repetition list and the like.

As a result, the need for specific PSDs being attached to specific cryptographic modules is eliminated. A Postal Server subsystem provides cryptographic module management services that allow multiple cryptographic modules to exist and function on one server, so additional cryptographic modules can easily be installed on a server. The Postal Sever subsystem is easy to scale by adding more cryptographic modules and using commonly known Internet load-balancing techniques to route inbound requests to the new cryptographic modules.

Referring back to FIG. 1, Postage servers 109 include one or more Postal servers and provide indicia creation, account maintenance, and revenue protection functionality for the exemplary on-line postage system. The Postage servers 109 may include several physical servers in several distinct logical groupings, or services as described below. The individual servers could be located within one facility, or in several facilities, physically separated by great distance but connected by secure communication links.

Cryptographic modules 110 are responsible for creating PSDs and manipulating PSD data to protect sensitive information from disclosure, generating the cryptographic components of the digital indicia, and securely adjusting the user registration. When a user wishes to print VBI, for example, postage or purchase additional VBI or postage value, a user state is instantiated in the PSD implemented within one of the cryptographic modules 110. Database 111 includes all the data accessible on-line for indicia creation, account maintenance, and revenue protection processes. Postage servers 109, Database 130, and cryptographic modules 110 are maintained in a physically secured environment, such as a vault.

Figure 2:
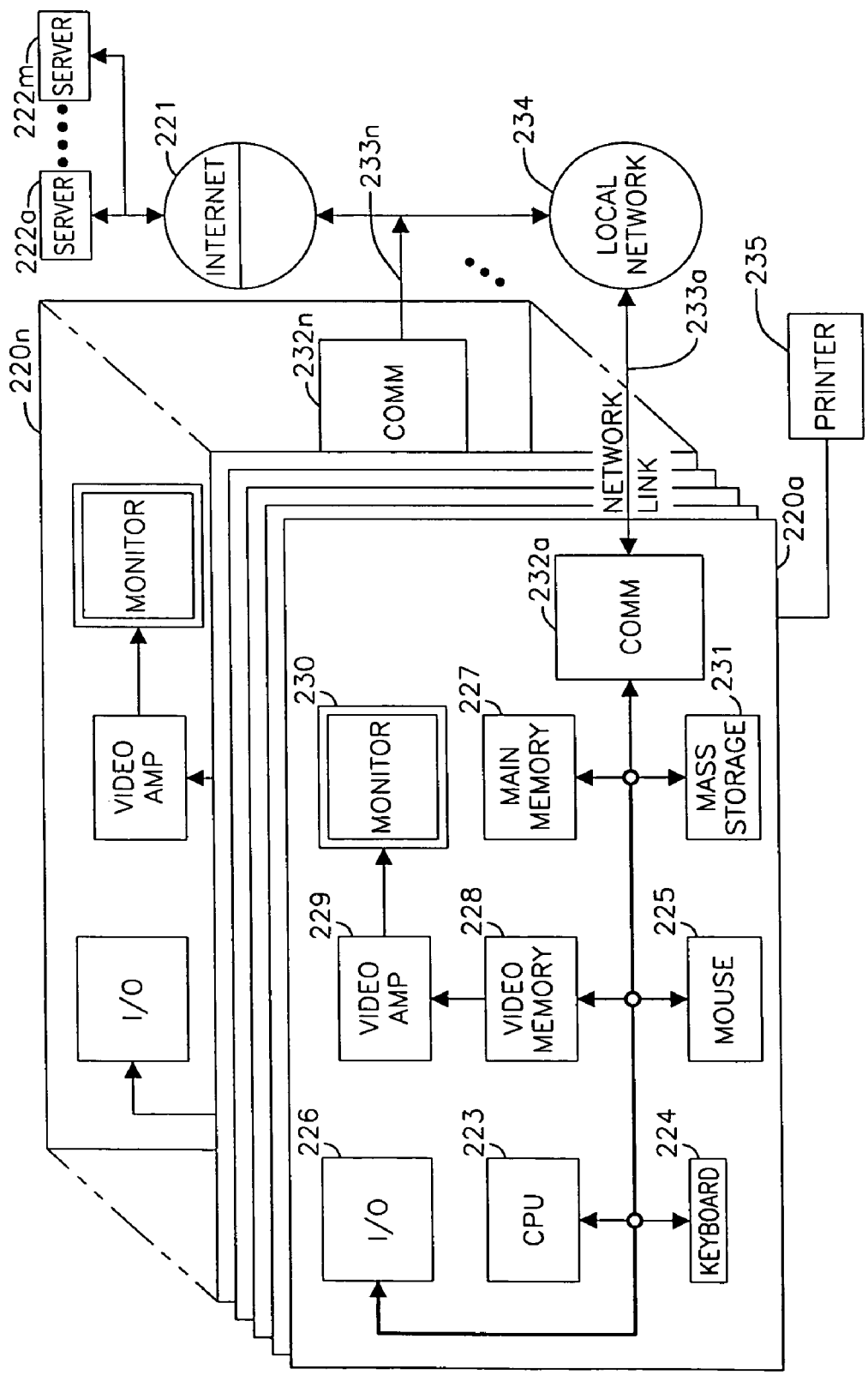
FIG. 2 is a block diagram of a remote user computer connected to a server via Internet.

FIG. 2 shows a simplified system block diagram of a typical Internet client/server environment used by an on-line VBI system in one embodiment of the present invention. PCs 220a-220n used by the postage purchasers are connected to the Internet 221 through the communication links 233a-233n. Each PC has access to one or more printers 235. Optionally, as is well understood in the art, a local network 234 may serve as the connection between some of the PCs, such as the PC 220a and the Internet 221 or other connections. Servers 222a-222m are also connected to the Internet 221 through respective communication links. Servers 222a-222m include information and databases accessible by PCs 220a-220n. The on-line VBI system of the present invention resides on one or more of Servers 222a-222m.

In this embodiment, each client system 220a-220m includes a CPU 223, a keyboard 224, a mouse 225, a mass storage device 231, main computer memory 227, video memory 228, a communication interface 232a, and an input/output device 226 coupled and interacting via a communication bus. The data and images to be displayed on the monitor 230 are transferred first from the video memory 228 to the video amplifier 229 and then to the monitor 230. The communication interface 232a communicates with the servers 222a-222m via a network link 233a. The network link connects the client system to a local network 234. The local network 234 communicates with the Internet 221.

In one embodiment; a customer, preferably licensed by the USPS and registered with an IBIP vendor (such as Stamps.com), sends a request for authorization to print a desired amount of VBI, such as postage. The server system verifies that the user's account holds sufficient funds to cover the requested amount of postage, and if so, grants the request. The server then sends authorization to the client system. The client system then sends image information for printing of a postal indicium for the granted amount to a printer so that the postal indicium is printed on an envelope or label.

In one embodiment, when a client system sends a VBI print request to the server system, the request needs to be authenticated before the client system is allowed to print the VBI, and while the VBI is being printed. The request is cryptographically authenticated using an authentication code. The client system sends a password (or passphrase) entered by a user to the server for verification. If the password fails, a preferably asynchronous dynamic password verification method terminates the session and printing of the VBI is aborted. Also, the server system communicates with a system located at a certification authority for verification and authentication purposes.

In one embodiment, the information processing components of the on-line VBI system include a client system, a postage server system located in a highly secure facility, a USPS system and the Internet as the communication medium among those systems. The information processing equipment communicates over a secured communication line.

Preferably, the security and authenticity of the information communicated among the systems are accomplished on a software level through the built-in features of a Secured Socket Layer (SSL) Internet communication protocol. An encryption hardware module embedded in the server system is also used to secure information as it is processed by the secure system and to ensure authenticity and legitimacy of requests made and granted.

The on-line VBI system is based on a client/server architecture. Generally, in a system based on client/server architecture the server system delivers information to the client system. That is, the client system requests the services of a generally larger computer. In one embodiment, the client is a local personal computer and the server is a more powerful group of computers that houses the information. The connection from the client to the server is made via a Local Area Network, a phone line or a TCP/IP based WAN on the Internet or any other types of communication links such as wireless or satellite links. A primary reason to set up a client/server network is to allow many clients access to the same applications and files stored on the server system.

The on-line VBI system does not require any special purpose hardware for the client system. The client system is implemented in the form of software that can be executed on a user computer (client system) allowing the user computer to function as a virtual VBI meter. The software can only be executed for the purpose of printing the VBI indicia when the user computer is in communication with a server computer located, for example, at a VBI meter vendor's facility (server system). The server system is capable of communicating with one or more client systems simultaneously.

Figure 4:
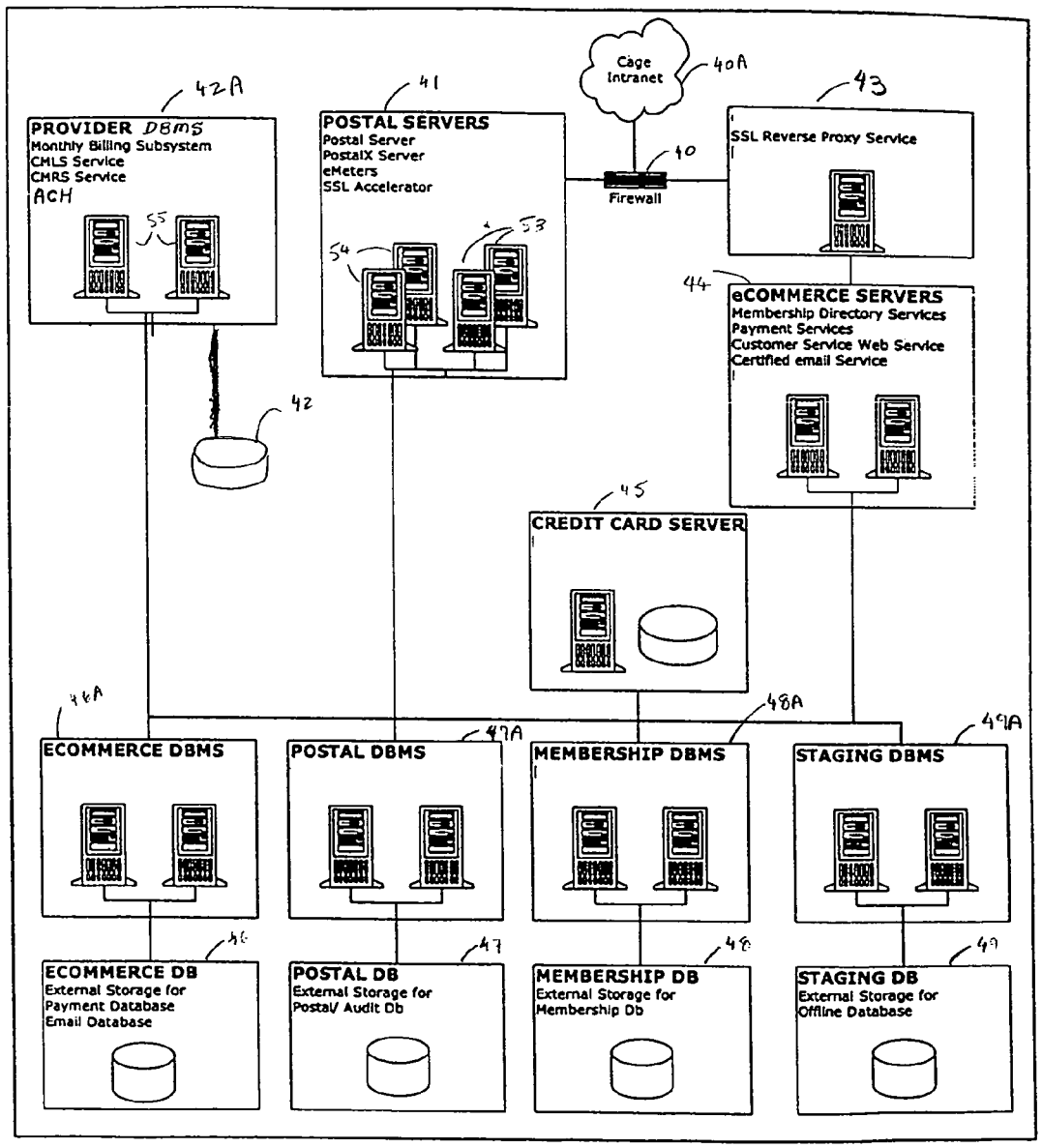
FIG. 4 is a block diagram of servers, databases, and services provided by one embodiment of the present invention.
Figure 4A:
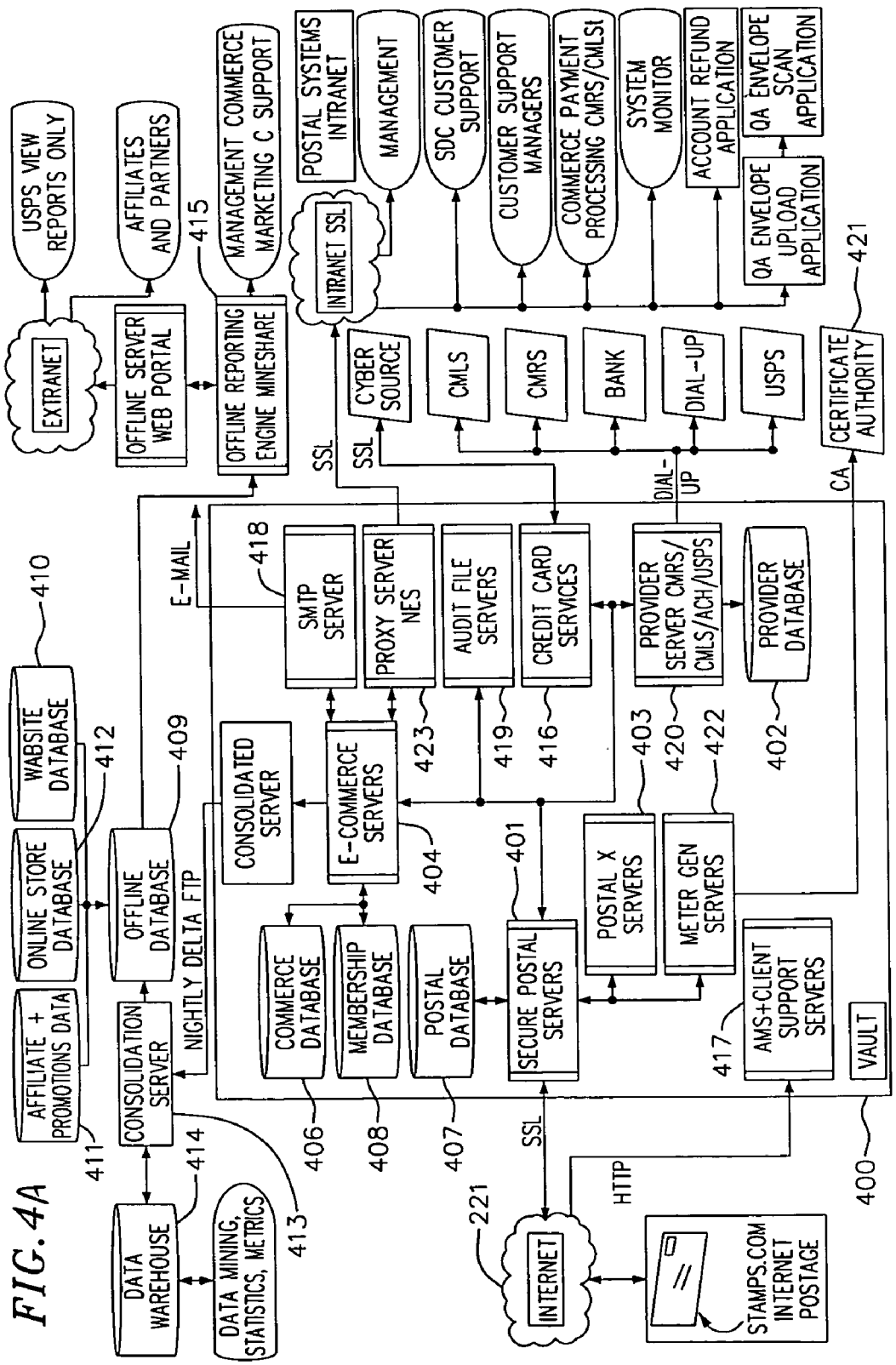
FIG. 4A is a block diagram of servers, databases, and services provided by one embodiment of the present invention.

In one embodiment, the on-line system includes the following subsystems: the Database subsystem, the Postal Server subsystem, the Provider Server subsystem, the E-commerce subsystem, the Staging subsystem, the Client Support subsystem, the Decision Support subsystem, the SMTP subsystem, the Address Matching service (AMS) subsystem, the SSL Proxy Server subsystem and the Web Server subsystem, and the like, as shown in FIGS. 4 and 4A. Preferably, the Database, Postal Server, Provider, E-commerce, Client Support Services, SMTP, AMS, SSL Proxy Server, Web Server subsystems, and Staging subsystems reside in the vault while the Decision Support Services reside outside the vault.

Postage servers 109 in FIG. 1 include a string of servers connected to the Internet, for example, through a T1 line, and are preferably protected by a firewall. The firewall permits a client to communicate with a server system, only if the information packet transmitted by the client system complies with a security policy set by the server system. The firewall not only protects the system from unauthorized users on the Internet, it also separates the Public Network (PUBNET) from the Private Network (PRVNET). This ensures that packets from the Internet will not go to any location but the PUBNET. The string of servers form the different subsystems of the postal system. The services provided by the different subsystems of the on-line VBI system are designed to allow flexibility and expansion and reduce specific hardware dependency.

The Database subsystem is comprised of multiple databases. FIG. 4 illustrates an exemplary Database subsystem which includes the Postal Database 47, Postal Database Management System 47A, the Provider Database 42, Provider Database Management System 42A, the E-commerce Database 46, E-commerce Database Management System 46A, the Membership Database 48, the Membership Database Management System 48A, the Staging Services Database 49, and the Staging Services Database Management System 49A protected by firewall 40. Different portions of the Database subsystem are described below. Also, the databases are referred to as a portion of the Database subsystem after an initial reference as the subsystem database (e.g., Postal Database first, then Postal portion of the Database subsystem). A secure standby backup database server (not shown) mirrors the primary database server to minimize the impact of any interruption of the primary database server.

The Postal Server subsystem 41 manages client and remote administration access to server functionality, authenticates clients and allows clients to establish a secure connection to the on-line VBI system. The Postal Server subsystem also manages access to USPS specific data such as PSD information and a user's license information. The Postal Server subsystem queries the Postal portion of the Database subsystem for the necessary information to complete the task. The query travels through the firewall 40 to the Postal portion of the Database subsystem. The Postal Server subsystem is the subsystem in the Public Network that has access to the Database subsystem.

In one embodiment, the Database subsystem is comprised of multiple databases, as shown in FIG. 4A. In this embodiment, the Database 411 includes the Affiliate DBMS and the Source IDs DBMS. The Affiliate DBMS manages affiliate information (e.g., affiliate's name, phone number, and affiliate's Website information) that is stored on the Affiliate Database. Using the data from this database, marketing and business reports are generated. The Source IDs Database contains information about the incoming links to the vendor's Website (e.g., partners' information, what services the vendor offers, what marketing program is associated with the incoming links, and co-branding information). Using the data from this database, marketing and business reports are generated.

The Online Store Database 412 contains commerce product information, working orders, billing information, password reset table, and other marketing related information. Website database 410 keeps track of user accesses to the vendor website. This database keeps track of users who access the vendor website, users who are downloading information and programs, and the links from which users access the vendor website. After storing these data on the Website Database 410, software tools are used to generate the following information:

Web Site Status
    Web Site Reports
    Form Results
    Download Successes
    Signup, Downloads, and Demographic Graphs
    Web Server Statistics (Analog)
    Web Server Statistics (Web Analyzer)

Offline database 409 manages the VBI data (except meter information), postal transactions data, financial transactions data (e.g., credit card purchases, free postage issued, bill credits, and bill debits), customer marketing information, commerce product information, meter license information, meter resets, meter history, and meter movement information. Consolidation Server 413 acts as a repository for data, centralizing data for easy transportation outside the vault 400. The Consolidation Server hosts both file and database services, allowing both dumps of activity logs and reports as well as a consolidation point for all database data.

The Offline Reporting Engine MineShare Server 415 performs extraction transformation from the holding database that received transaction data from the Consolidated Database (Commerce database 406, Membership database 408, and Postal Database 407). Also, the Offline Reporting Engine MineShare Server handles some administrative tasks. Transaction data in the holding database contains the transaction information about meter licensing information, meter reset information, postage purchase transactions, and credit card transactions. After performing extraction transformation, business logic data are stored on Offline Database 409. Transaction reports are generated using the data on the Offline Database. Transaction reports contain marketing and business information.

The Data Warehouse database 414 of FIG. 4A includes all customer information, financial transactions, and aggregated information for marketing queries (e.g., how many customers have purchased postage). In one embodiment, commerce Database 406 includes a Payment Database, an E-mail Database, and a Stamp Mart Database. The E-mail DBMS manages access to the contents of e-mail that were sent out to everyone by vendor servers. The Stamp Mart database handles order form processing. The E-commerce Server 404 provides e-commerce related services on a user/group permission basis. It provides commerce-related services such as payment processing, pricing plan support and billing as well as customer care functionality and LDAP membership personalization services.

A Credit Card Service is invoked by the E-commerce Server 404 to authorize and capture funds from the customer's credit card account and to transfer them to the vendor's merchant bank. A Billing Service is used to provide bills through e-mail to customers based on selected billing plans An ACH service runs automatically at a configurable time. It retrieves all pending ACH requests and batches them to be sent to bank for postage purchases (i.e. money destined for the USPS), or Chase for fee payments which is destined for the vendor account.

The E-commerce DBMS 406 manages access to the vendor specific Payment, Credit Card, and Email Databases. A Membership DBMS manages access to the LDAP membership directory database 408 that hosts specific customer information and customer membership data. A Postal DBMS manages access to the Postal Database 407 where USPS specific data such as meter and licensing information are stored. A Postal Server 401 provides secure services to the Client, including client authentication, postage purchase, and indicia generation. The Postal Server requires cryptographic modules to perform all functions that involve client authentication, postage purchase, and indicia data generation.

Postal Transaction Server 403 provides business logic for postal functions such as device authorization and postage purchase/register manipulation. The Postal Transaction Server requires the cryptographic modules to perform all functions. There are four Client Support Servers. Address Matching Server (AMS) 417 verifies the correct address specified by a user. When the user enters a delivery address or a return address using the Client Software, the user does not need the address matching database on the user's local machine to verify the accuracy of the address. The Client software connects to the vendor's server and uses the central address database obtained from the USPS to verify the accuracy of the address. If the address is incorrect, the client software provides the user with a prioritized list of addresses to match the correct address. These choices are ranked in a user definable order. This information is represented using a plain text format.

The Client Support Servers 417 of FIG. 4A provides the following services: a Pricing Plan service, an Auto Update service, and a Printer Config service. The Pricing Plan Service provides information on pricing plans and payment methods available to the user. It also provides what credit cards are supported and whether ACH is supported. This information is represented preferably using a plain text format. The Auto Update Service verifies whether the user is running the latest Client Software. If there is newer Client Software, the Auto Update Server downloads the new patches to the user computer. The Client Support Database has tables for the client software update information. This information is represented using a plain text format.

Before the user tries to print postage, the user sends his or her printer driver information over the Internet in plain text. The Printer Config Service looks up the printer driver information in the Printer Driver Database to determine whether the printer driver is supported or not. When the user tries to configure the printer, the user prints a test envelope to test whether the postage printing is working properly or not. This testing envelope information is sent over the Internet in plain text and is stored in the Client Support Database.

MeterGen server 422 makes calls into the cryptographic module to create sufficient meters to ensure that the vendor can meet customer acquisition demands. SMTP Server 418 communicates with other SMTP servers, and it is used to forward e-mail to users. Gatekeeper Server works as a proxy server by handling the security and authentication validation for the smart card users to access customer and administration information that reside in the vault.

The Proxy Server 423 uses the Netscape™ Enterprise SSL library to provide a secure connection to the vault 400. Audit File Server 419 acts as a repository for module transaction logs. The Audit File Server verifies the audit logs that are digitally signed. The audit logs are verified in real time as they are being created. Postal Server writes audit logs to a shared hard drive on the Audit File Server. After these logs are verified, the Audit File Server preferably moves them from the shared hard drive to a hard drive that is not shared by any of the vendor servers.

Provider Server provides reporting and external communication functionality including the following services. CMLS Service forwards license applications and it processes responses from CMLS. The CMLS Service uses cryptographic functions provided by the Stamps.com Crypt library to decrypt the user's SSN/Tax ID/Employee ID. CMRS Service reports meter movement and resetting to the USPS Computerized Meter Resetting infrastructure. ACH Service is responsible for submitting ACH postage purchase requests to the USPS lockbox account at the bank. The CMLS Service uses cryptographic functions to decrypt the user's ACH account number.

After decrypting ACH account information, the ACH is encrypted using the vendor's script library. Then, the encrypted ACH file is e-mailed to the Commerce Group by the SMTP server. When the Commerce Group receives this encrypted e-mail, the vendor's Decrypt utility application is used to decrypt the ACH e-mail. After verifying the ACH information, the Commerce Group sends the ACH information through an encrypted device first and then uses a modem to upload the ACH information to a proper bank. The Certificate Authority issues certificates for all IBIP meters. The certificates are basically used to provide authentication for indicia produced by their respective meters.

The following are exemplary steps describing the certificate authorization process:

MeterGen asks the module to create a meter package,

The module returns a package and the meter's public key,

MeterGen creates a certificate request with the public key, signs the request with a USPS-issued smartcard, and submits the request to the USPS Certificate Authority, The Certificate Authority verifies the request came from the vendor then, it creates a new certificate and returns it to MeterGen, MeterGen verifies the certificate using the USPS Certificate Authority's certificate (e.g., to ensure it wasn't forged) and stores the certificate information in the package. The package is now ready to be associated with a customer.

The Postal Server subsystem 401 of FIG. 4A manages client and remote administration access to server functionality, authenticates clients and allows clients to establish a secure connection to the on-line VBI system. The Postal Server subsystem also manages access to USPS specific data such as PSD information and a user's license information. The Postal Server subsystem queries the Postal portion of the Database subsystem for the necessary information to complete the task. The query travels through the firewall to the Postal portion of the Database subsystem. The Postal Server subsystem is the subsystem in the Public Network that has access to the Database subsystem.

In one embodiment of the present invention, Postal Server 401 is a standalone server process that provides secure connections to both the clients and the server administration utilities, providing both client authentication and connection management functionality to the system. Postal Server 401 also houses postal-specific services that require high levels of security, such as purchasing postage or printing indicia. Postal Server 401 is comprised of at least one server, and the number of servers increases when more clients need to be authenticated, are purchasing postage or are printing postage indicia.

Figure 3:
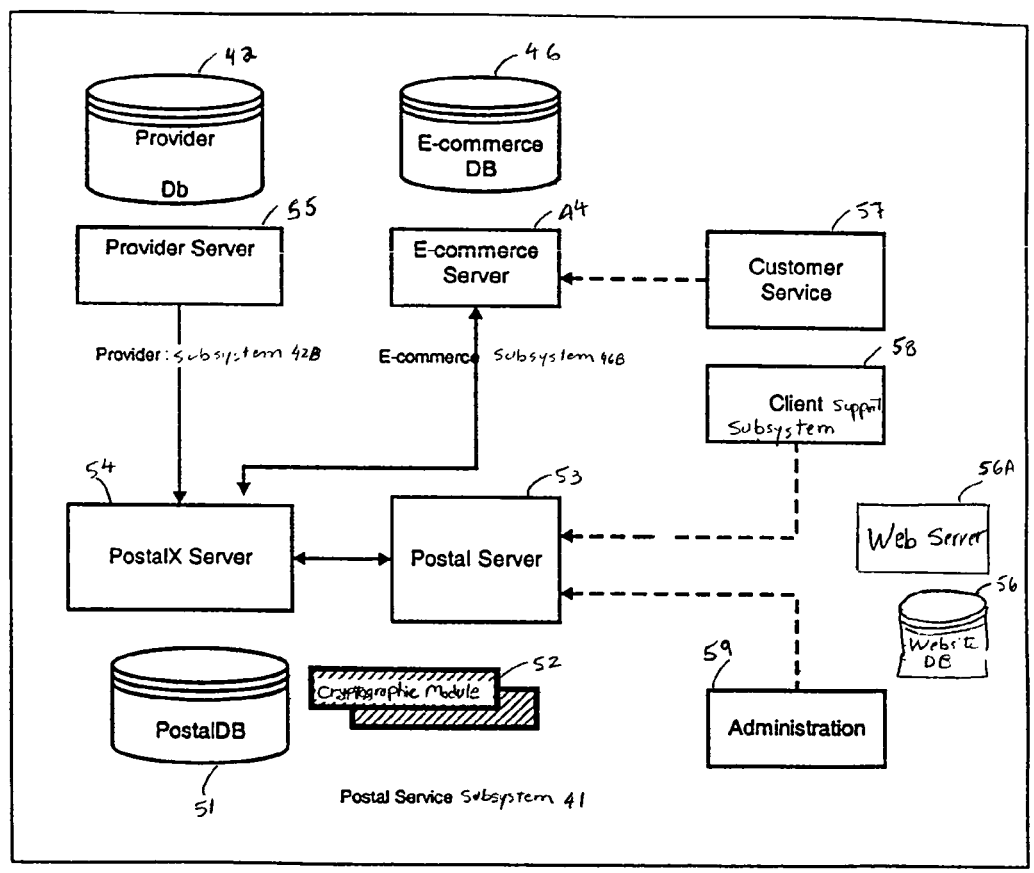
FIG. 3 is a block diagram of one embodiment of postage servers.

In one embodiment, as illustrated in FIG. 3, the Postal Server subsystem 41 is physically comprised of at least one cryptographic module 52, at least one Postal Server 53 and at least one PostalX Server (PSX) 54. When the workload is increased, the number of each of these devices can be increased to accommodate the additional work.

In one embodiment of the present invention, the cryptographic modules 52 are FIPS 140-1 certified hardware cards that include firmware to implement PSD functionality in a cryptographically secure way. The cryptographic modules are inserted into any of the servers in the Postal Server Infrastructure. The cryptographic modules are responsible for creating PSDs and manipulating PSD data to generate and verify digitally signed indicia. Since the PSD data is created and signed by a private key known only to a cryptographic module, the PSD data may be stored externally to the cryptographic modules without compromising security.

In one embodiment of the present invention, Postal Server 53 is a standalone server process that provides secure connections to both the clients and the server administration utilities, providing both client authentication and connection management functionality to the system. Postal Server 53 also houses postal-specific services that require high levels of security, such as purchasing postage or printing indicia. Postal Server 53 is comprised of at least one server, and the number of servers increases when more clients need to be authenticated, are purchasing postage or are printing postage indicia.

The growth in the number of servers of the Postal Server will not impact the performance of the system since the system design allows for scalability. The Postal Server is designed in such a way that all of the business logic is processed in the servers and not in the database. By locating the transaction processing in the servers, increases in the number of transactions can be easily handled by adding additional servers. Also, since each transaction is stateless (the application does not remember the specific hardware device the last transaction utilized), multiple machines can be added to each subsystem in order to handle increased loads. In one embodiment, load balancing hardware and software techniques are used to distribute traffic among the multiple servers.

In one embodiment of the present invention, PXS 54 is a standalone server process that provides trusted plain-text access to in-vault components. PXS 54 hosts postal-specific services that are protected from access external to the vault via a firewall. The PostalX Services provide business logic for postal functions such as device authorization and postage purchase/register manipulation. The PXS services require cryptographic modules to perform all functions because the PXS services are vital to the system's integrity and are protected by encryption. The PXS services can be located on one physical server or multiple machines depending on the number of postal-specific transactions.

The growth in the number of servers of the PostalX Server will not impact the performance of the system since the system design allows for scalability in two ways. the PostalX Server is designed in such a way that all of the business logic is encapsulated in the servers, not in the database. By locating the transaction processing in the servers, increases in the number of transactions can be easily handled by adding additional servers. Also, since each transaction is stateless, multiple machines can be added to each subsystem in order to handle increased loads. In one embodiment, load balancing hardware and software techniques are used to distribute traffic among the multiple servers.

Referring back to FIG. 4, the Postal Database Management System 47A manages access to the Postal section of the Database subsystem where USPS specific data such as meter and licensing information is stored. The Postal Database Management System is scalable and can be expanded to meet the needs of the Postal Server subsystem. The database schema design allows for the data to be partitioned across multiple physical databases. In one embodiment of the invention, the database is managed by relational database management software, such as MS SQL Server or the like. In one embodiment, the Postal Database Management System runs on two hardware servers.

The Postal Database 47 is a secure database that stores all information for the Postal Server subsystem. The Postal portion of the Database subsystem contains the postal-specific information such as licensing, registration, and meter-specific data for all of the customers. Access to the Postal portion of the Database subsystem occurs through the Postal Server subsystem. Each piece of client software has a unique software serial number, which will be generated and kept in the database during product registration.

Provider subsystem 42B provides reporting and external communication functionality for the Postal Information System. Preferably, the Provider subsystem is located on the PRVNET along with the Database Subsystem and communicates directly with the Database Subsystem when the Provider Subsystem services request Database subsystem information. As shown in FIG. 3, Provider Subsystem 42B includes Provider Server 55 and Provider Database 42. The Provider Subsystem 42B includes the following services: Central Metering License Services (CMLS), Central Meter Resetting Services (CMRS), Automated Clearing House (ACH) transactions, Credit Card services and Billing services. In one embodiment the Provider subsystem 42B runs on two hardware servers as shown in FIG. 4.

The CMLS service forwards license applications to and processes requests from the CMLS in the USPS through a CMLS/CMRS communication link. The CMRS service provides meter movement and meter resetting information through the CMLS/CMRS communication link to the USPS Computerized Meter resetting infrastructure. The ACH Service submits ACH postage purchase requests through an ACH communication link to a USPS lockbox account at a bank. The Credit Card Service is invoked by the E-commerce services to authorize and capture funds from the customer's credit card account and transfer them to a designated merchant bank. The Billing Service provides bills through e-mail to customers based on selected billing plans. All of the Provider subsystem's communication with external devices is secure, since the communication is encrypted.

The services included in the Provider subsystem 42B are classified as either services running across multiple servers or Singleton services. A Singleton service is a service where only one effective instance is executing at one time, so multiple operations of the service will not be operating at the same time. Preferably, the CMLS, CMRS and ACH services are all Singleton services and are not scalable because they transmit data in a specific format at specified times to external USPS or banking systems. The remaining services in the Provider subsystem (Credit Card and Billing services) are scalable and can be run on multiple servers.

The Provider Database Management System 42A manages access to the Provider section of the Database subsystem where Provider specific data such as Meter resetting records, Postage Value Download (PVD) information, batch status information and CMLS license information is stored. The PVD information is included in the log file that is sent to the USPS on a regular basis. The Provider Database Management Services are scalable and can be expanded to meet the needs of the Provider Server subsystem. The schema design allows for the data to be partitioned across multiple physical databases. In one embodiment, the Provider Database Management System runs on two hardware servers.

The Provider Database 42 is a secure database that stores all information for the Provider Server subsystem. The Provider portion of the Database subsystem contains Provider subsystem specific data such as Meter resetting records, PVD information, batch status information and CMLS license information.

The E-commerce subsystem 46B, shown in FIG. 3, provides functionality for the E-commerce related services required by Customer Support personnel and system administrators. The Customer Support personnel and system administrators access the on-line postage system through the E-commerce subsystem. E-commerce subsystem 46B communicates with the Database subsystem through the Postal Server subsystem and preferably is connected to a Public Network. The E-Commerce subsystem also provides commerce-related services, such as payment processing, pricing plan support and billing, as well as customer care functionality and Lightweight Directory Access Protocol (LDAP) membership personalization services.

LDAP is a protocol for accessing online directory services over the TCP/IP network protocol and can be used to access standalone LDAP directory services or directory services supporting the X.500 standard. It provides a standard way for Internet clients, applications and Web servers to access directory listings of large number of Internet users.

E-Commerce subsystem 46B also includes a group of servers and databases including the Proxy Services 43, E-commerce Servers 44, E-commerce Database 46, Membership Database 48, E-commerce Database Management System 46A, Membership Database Management System 48A, and Credit Card Server 45.

Proxy Services 43 provide Customer Support and authenticated access for administrators to the E-Commerce Servers. In one embodiment, the Proxy Services run on one hardware server. The E-commerce Services, such as payment processing, pricing plan support, billing, customer care functionality and LDAP membership services run on the E-commerce Servers 44. The number of the E-commerce servers can easily be increased to meet the growing needs of the E-commerce subsystem. The growing number of servers will not impact the performance of the on-line postage system because the system design allows for scalability of the servers.

E-commerce Database Management System 46A manages access to E-commerce Database 46 where commerce related information is stored, as shown in FIG. 4. E-Commerce Database 46 includes information on non-postal commerce transactions, credit card validations, customer invoicing, etc. E-commerce Database Management System 46A is scalable and may easily be expanded to meet the needs of the system. If the number of E-commerce related transactions increase, the database schema design allows for the data to be partitioned across additional physical databases. The schema can be easily updated to add new devices and incorporate them into the Database subsystem. In one embodiment, the E-commerce Database Management System is resident on two hardware servers. The E-commerce portion of the Database subsystem includes specific data such as purchase transactions, pricing plans, billing information, and customer account information.

Membership Database Management System 48A provides access to Membership database 48. The Membership Database Management System manages access to the LDAP membership directory database that hosts specific customer information and customer membership data. The Membership Database contains all customer and internal user profile information, plus security information for all internal system users. The Membership Database Management System is scalable and expands to meet the needs of the system. If the number of customer profile transactions increase, the database schema design allows for the data to be partitioned across additional physical databases. The schema can be easily updated to add new devices and incorporate them into the Database subsystem. In one embodiment, Membership Database Management System 48A is resident on two hardware servers. The Membership portion of the Database subsystem includes specific customer profile information.

The SSL Proxy server (part of Proxy 43) allows secure HTTP access from a web browser and is used by the system administrators to access the e-commerce subsystem. Web Server 56A is used to maintain the website, facilitate the customer support activities and distribute the client software to interested parties. Web Server 56A communicates with the clients 58 through the Internet 221 and the internal departments via the Intranet LAN 40A. The information for maintaining the website and tracking affiliate performance is located in Website Database 56. An Affiliate Database (not shown) stores client software versions, affiliate profiles and tracking codes and Advertising and Marketing tracking numbers.

Figure 5:
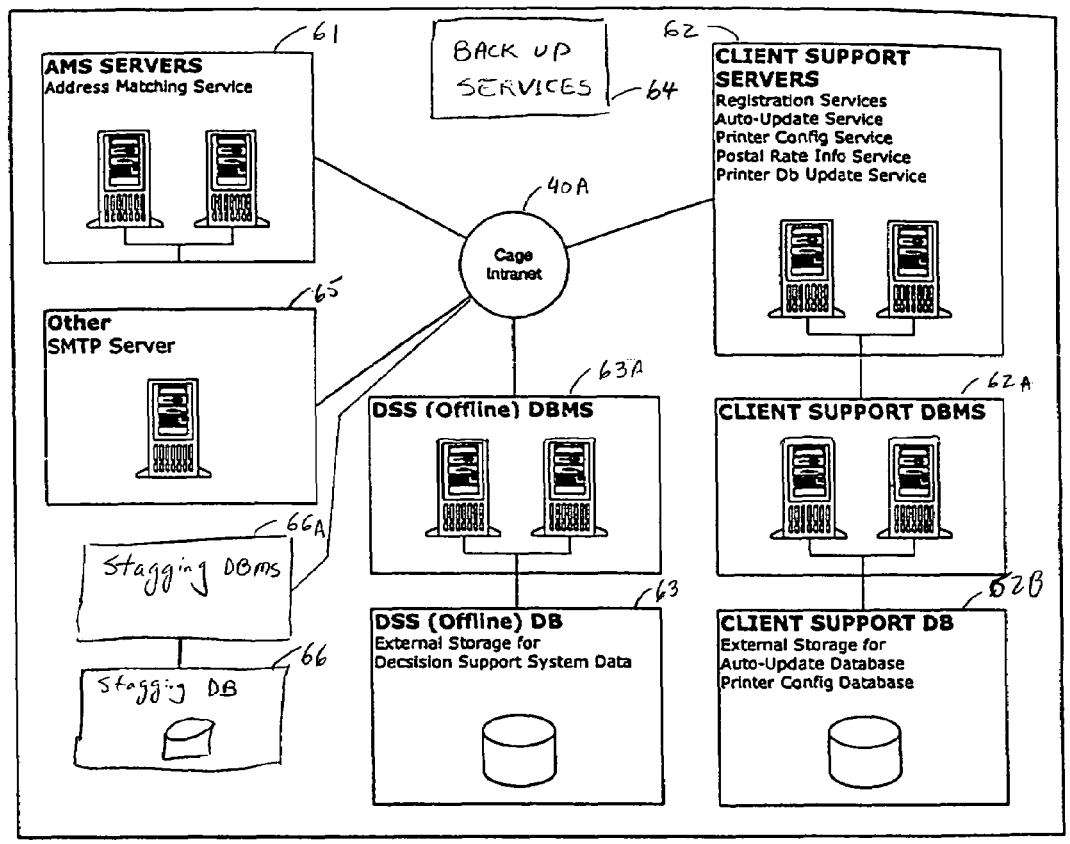
FIG. 5 is a block diagram of further servers, databases, and services provided by one embodiment of the present invention.

FIG. 5 illustrates more subsystems of the exemplary on-line postage system, namely, AMS servers 61, Client Support Servers 62, Client Support Database Management System 62A, Client Support Database 62B, the Decision Support Services (DSS) Database Management System 63A, DSS database 63, Staging Database Management System 66A and Staging Database 66, SMTP server 65, and Backup Services 65.

SMTP server 65 runs the internal and external E-mail systems. The Staging Services subsystem coordinates aggregation of business data. Preferably, each night, all of the changes made in the Database subsystem in the last 24 hours are loaded into Staging Database 66. Staging Services Database Management System 66A manages access to Staging Database 66. After gathering changes in the databases, Staging Services Database Management System 66A strips out all of the critical data such as credit card numbers and critical USPS specific information, and moves the changes to offline databases. Staging Services Database Management System 66A is scalable and may be easily be expanded to meet the needs of the system. In one embodiment, the Staging Services Database Management System is resident on two hardware servers.

Backup Services subsystem 64 provides the data backup for the Database subsystem. The first backup is the secondary Database Server, which is a live standby server that mirrors the primary Database server as described above. The second backup is a transaction log on the Postal Server that is stored (off-loaded) preferably every couple of minutes in a tape backup device, which allows the system administrators to reconstruct the system up to the last transactions if a database failure occurs. Finally, the entire Database subsystem is backed up every day and archived off premises to ensure that the data is available if the physical on-line VBI system suffers catastrophic failure.

The AMS subsystem 61 validates source and destination addresses against a USPS table to verify the mail is being sent to a recognized location. This service is utilized each time the user attempts to print postal indicia. The AMS system is used when a user enters a delivery address or a return address using the client software. The user does not need the address matching database on the user's local machine to verify the accuracy of the address. The client software connects to the Postage Server and uses a central address database obtained from the USPS to verify the accuracy of the address. If the address is incorrect, the client software provides the user with a prioritized list of addresses to match the correct address. Preferably, these choices are ranked in order according to the type of match.

Since the printing of VBI indicia is the most common transaction in this system, this service is separated from other services in order to ensure the AMS does not create performance problems in the on-line VBI system. All of the services, except for the previously-mentioned Singleton services, are scalable and are modified to adjust to the number of transactions requested. AMS transactions increase substantially when more individuals utilize the system so the AMS transactions are scaled separately from the other transactions. Preferably, load balancing services are used to assist distributing the workload to the AMS servers. In one embodiment, the AMS Services run on two servers.

The Client Support Services subsystem 58 of FIG. 3 is comprised of the client services that typically do not require secure transactions. Client Support Services subsystem 58 of FIG. 3 includes the Client Support Servers 62, the Client Support Database Management System 62A, and the Client Support Database 62B, as shown in FIG. 5. The services that execute on the Client Support Servers preferably include, Registration Services, Auto-Update Service, Printer Config Service, Postal Rate Info Service, and Printer DB Update Service. The Client Support Services are typically low in volume, however, the number of servers and the capacity of the database can be readily scaled according to the workload of the system. In one embodiment, the Client Support Services are run on two servers.

The Registration Services includes supported payment type and billing plan information. The Auto-Update Service updates the client software when new client software versions are released. The Printer Configuration Services assist in setting-up the printer to guarantee that the indicia printed meets USPS criteria. The Rates Service calculates the correct rate for the client based on class, destination and weight. The Printer Database Service updates the on-line VBI system with any new printer or printing information.

The Client Support Database Management System 62A of FIG. 5 manages access to the Client Support Database (CSD) 62B. The processing requirements of CSD 62B are low, but availability of the CSD is vital, so multiple physical servers running in a cluster are necessary to ensure this availability. In one embodiment, the Client Support Database Management System runs on two hardware servers connected to one external CSD storage devices.

CSD 62B is an external storage component for the Client Support Services subsystem 58. Transactions executing on the Client Support Servers requiring storage utilize the CSD 62B. The data storage size requirements for CSD 62B are relatively low. As the number of Client Support Services transactions grows, the database will grow. The database schema design allows for the data to be partitioned across multiple physical databases.

The Decision Support System (DSS) includes the DSS Database Management System 63A and the DSS Database 63, as shown in FIG. 5. The DSS allows restricted (read-only, time delayed) access to the postal data. The DSS Database Management System 63A controls access to DSS Database 63. In one embodiment, the DSS. various accounting tasks for the Staging Services Database Management System. As the processing requirements of the DSS vary, the availability of the DSS subsystem may also vary. Therefore, DSS Database Management System 63A runs in a cluster on multiple servers to ensure DSS availability. DSS Database 63 is preferably offline and includes most or all of the user's profile information. Preferably, Staging Database 66 receives a nightly automatic delta update, which gathers all of the data that has changed over the previous 24 hours. The data that has changed over the last 24 hours is filtered according to data access guidelines. The data is transferred from Staging Database 66 to DSS Database 63. The update is a one-way update only. After the data has been moved, it is available for reading and queries for the Marketing, Finance, Customer Support and Management departments. DSS Database 63 contains user profile information, including historical transaction information. As the number of DSS transactions grows, DSS Database 63 grows to accommodate the additional transactions. A database schema design allows for the data to be partitioned across multiple physical databases.

Figure 6:
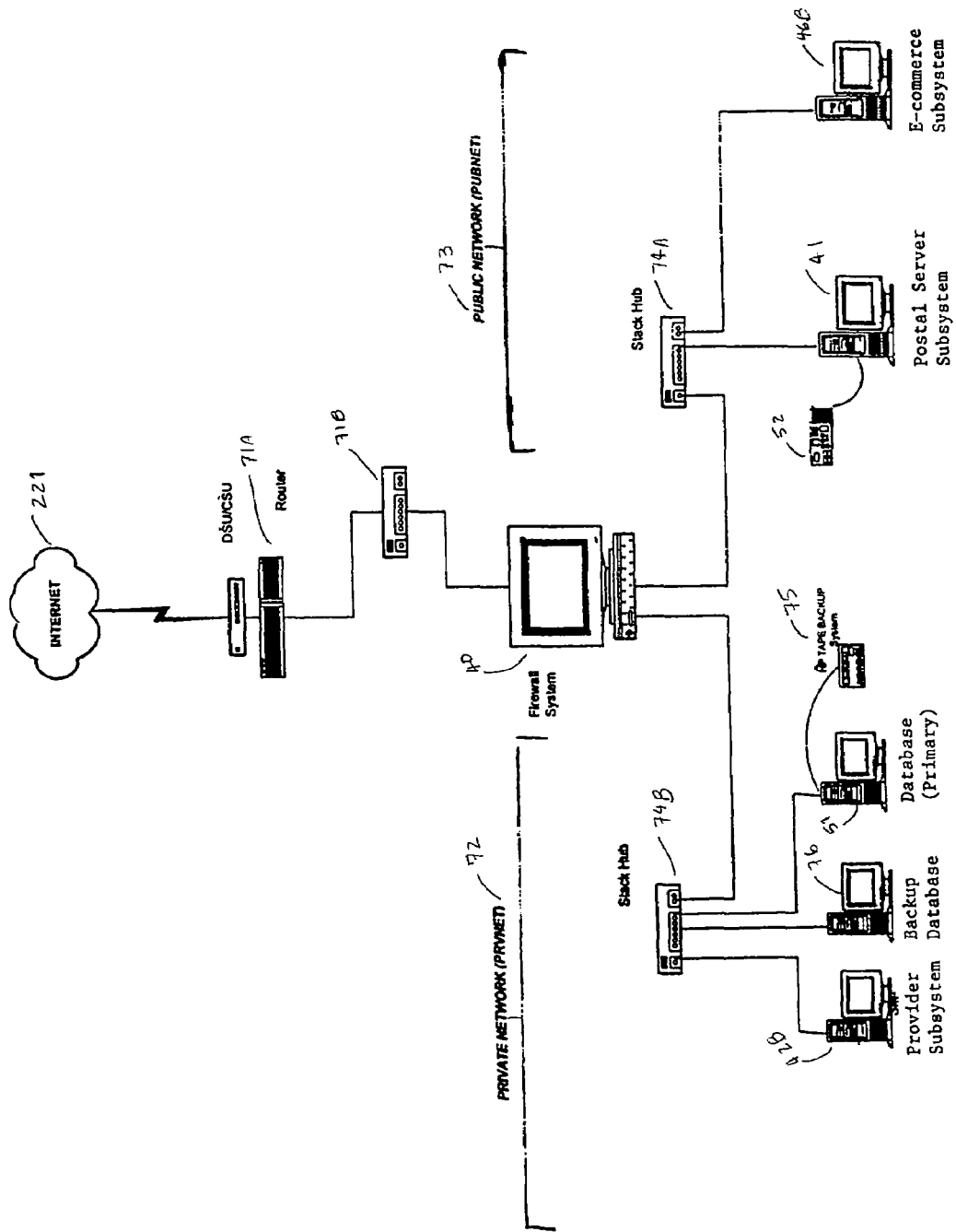
FIG. 6 is a block diagram of some of the hardware components that provide security and back up to a database.

The on-line VBI system is designed to prevent unauthorized electronic access to the Database subsystem. FIG. 6 illustrates the hardware components that provide the security to the Database subsystem. The first line of defense is firewall 40, which prevents unauthorized access to the servers. Firewall 40 is connected to Public Network 73 and Private Network 72. Router 71A and switch 71B direct data from Internet 221 to firewall 40 and together, serve as the portal from the Internet 221 to the on-line VBI system servers. Stack Hubs 74A and 74B interface Public Network 73 and Private Network 72 to the firewall 40 respectively.

Connected to Public Network 73 through Stack Hub 74A are Postal Server subsystem 41 and E-commerce subsystem 46B. Cryptographic module 52 is connected to Postal Server subsystem 41. Connected to Private Network 72 through Stack Hub 74B are Provider subsystem 42B, a Back up database 76 that mirrors information as data is stored, and the primary database 51. A tape back up system 75 is connected to primary database 51 for periodically backing up the database.

The second line of defense is the protection of the Database subsystem by the Postal Server Subsystem. The Public Network 73 includes the E-commerce subsystem 46B and the Postal Server subsystem 41. The Private Network 72 includes the Database subsystem 51 and the Provider subsystem 42B. The firewall 40 is configured to deny access to the Private Network 72 by unauthorized users. The only access to the Private Network 72 (specifically the Database subsystem 51) by external users is through the firewall 40. In the Public Network 73, the Postal Server subsystem 41 controls access to the Private Network 72. In one embodiment, dual Cisco PIX 520 hardware firewalls including two independent Network Interface Cards (NIC) are used for firewall 40.

The Postal Server subsystem 41 executes an authentication algorithm for dynamically and asynchronously verifying passwords to ensure that only properly authenticated users are allowed access to the Database subsystem 51. The Postal Server subsystem 41 runs software built around the authentication algorithm, and thus acts as a gatekeeper to prohibit unauthorized users from entering the Postal Server subsystem 41 and the Database subsystem 51. Preferably, only the custom made software built around the authentication algorithm runs on the Postal Server subsystem 41 for security purposes.

Information in the Database subsystem 51 can be retrieved or altered only by accessing the database through the Postal Server subsystem 41. However, the authentication algorithm executed by the Postal Server subsystem 41 prevents unauthorized access to the Database subsystem 51 resulting in secure information in the Database subsystem. Preferably, the E-Commerce subsystem 46B, also, only communicates with the Database subsystem 51 through the Postal Server subsystem 41. The Provider subsystem 42B communicates with the Database subsystem 51 directly through the Private Network 72.

The communications between the cryptographic modules and the Postal Server subsystem are secured and authenticated through a security protocol. This protocol includes two distinct states. The first state is the registration/authorization state that is a one-time only (per user) state in which the client software and each cryptographic module preferably cooperate in establishing two shared secrets: a user secret (e.g., a password) and a hashed message authentication key (HMK). The second state is the operational state that follows a successful completion of the registration/authorization state. The operational state is the normal transaction state for client software and each cryptographic module.

In the first part of the authorization state, the cryptographic module should authenticate itself to the client software by a challenge-response protocol. The cryptographic module and the client software share a public cryptography key pair that preestablishes a condition of trust. The cryptographic module keeps the private key, and a copy of the corresponding public key is embedded in the client software. The client software generates a random number as a challenge message and sends it as cleartext to the cryptographic module. The cryptographic module responds by signing the received challenge with its private key and returns the resulting ciphertext to the client software. Using the public key, the client software signs the challenge message it had sent and compares it to the cryptographic module's signature of the same challenge message received from the cryptographic module. If the signed messages compare, the cryptographic module is authenticated.

Once the cryptographic module is authenticated, the client software generates a HMK and prompts the user for a password. The client software then encrypts both the HMK and the user's password with its public Key, and sends this ciphertext to the cryptographic module. The user's name is also sent in clear text to the Postal Server. The cryptographic module uses its private RSA key to decrypt the password and the HMK. The PSD now has both the HMK and the user's password. This information is associated with the user's name and is cryptographically stored in the database.

Figure 7:
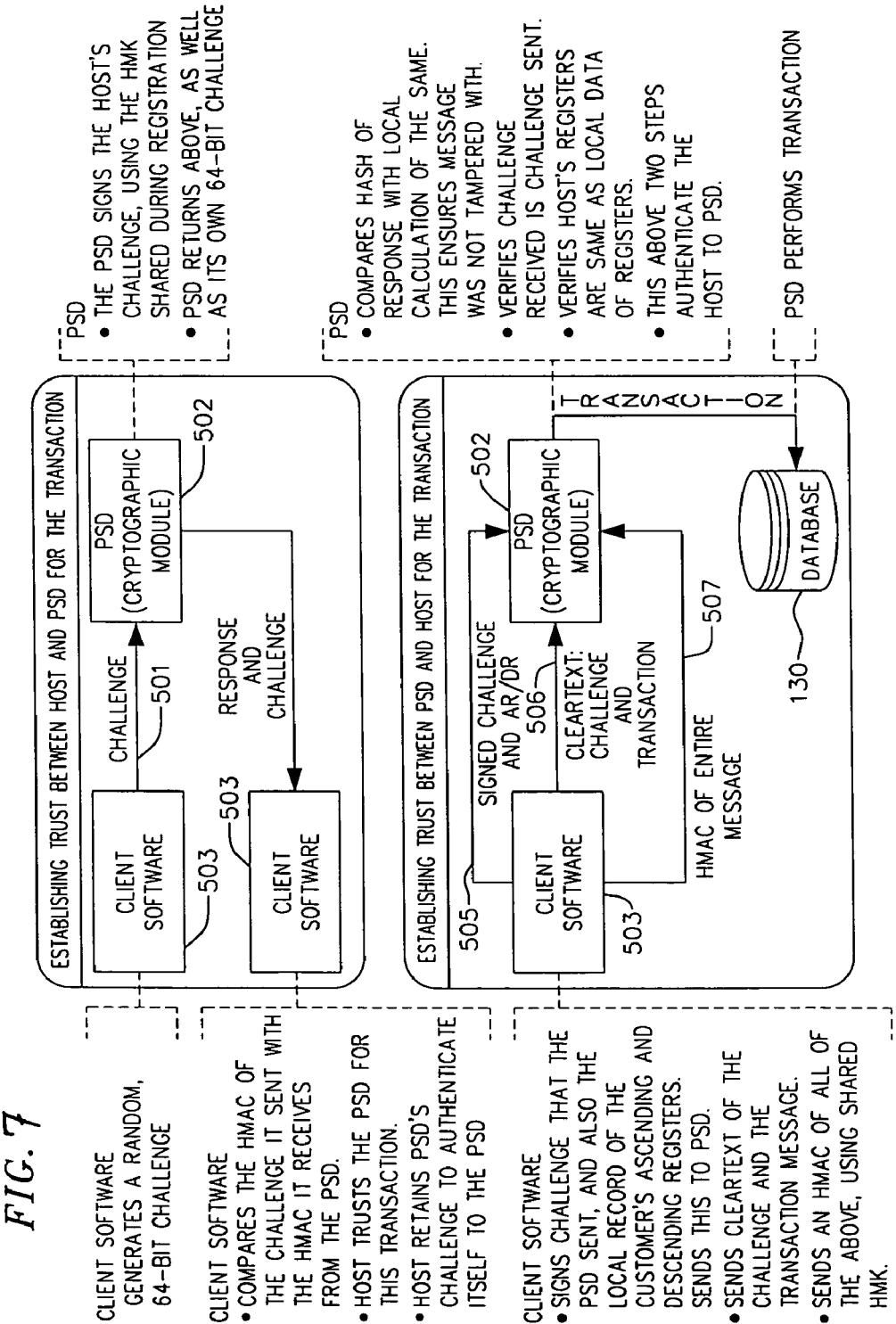
FIG. 7 is a block diagram of a client software, a cryptographic module, and a typical transaction between them during an operational state.

With the success of the authorization state, the client software not only trusts the cryptographic module, but also shares a common HMK with the cryptographic module, which it uses to sign and challenge each successive message. FIG. 7 illustrates client software and cryptographic module (PSD) 52 communication during the operational state. Client software 53 sends a new challenge message to cryptographic module 52, as shown by 81. The cryptographic module responds by signing the challenge with the shared HMK and then sends this ciphertext back to the client software, along with its own challenge, as shown by 82. Client software 53 compares the ciphertext of the challenge it originally sent to the cryptographic module, and also signs the message received from the cryptographic module. If the signatures compare, the client software trusts the cryptographic module for this transaction. Client software 53 uses the cryptographic module challenge message to authenticate itself to cryptographic module 52.

Client software 53 now sends the signed challenge that cryptographic module 52 had sent, with the addition of the client software local record of the user's ascending and descending registers, as shown by 83. (The ascending register records the amount of postage that is dispensed or printed on each transaction and the descending register records the value or amount of postage that may be dispensed and decreases from an original or charged amount as postage is printed.)

The client software also sends a cleartext of the challenge and the transaction message, as shown by 84. Next, the client software sends a Hash Message Authentication Code (HMAC) for all of the data sent in 83 and 84, using shared HMK, as shown by 85. HMAC is a digital signature created using a hash algorithm with an arbitrary message and the secret key (HMK). The client software sends the original arbitrary message and the HMAC to Postal Server via the network. HMK, as the HMAC Key, stays in the client software 53. The cryptographic module 52 already has a copy of HMK because it was sent over to Postal Server during the user registration process. In another embodiment, Data Encryption Standard Message Authentication Code (DES MAC) is used instead of HMAC.

Once 83, 84, and 85 are received by cryptographic module 52, the cryptographic module verifies that the client software's response is identical with its local calculation of the same. This ensures that the message was not tampered with during transit. The cryptographic module then verifies the challenge it received from the client software, in fact, the challenge the cryptographic module had sent to the client software. This authenticates the client software to the cryptographic module.

Next, the cryptographic module verifies that the record of the ascending and descending registers that the client software sent is identical to the cryptographic module's local record of the same registers. This ensures that the client software's record of postage available and postage printed matches the cryptographic module's record. Upon a successful verification of the above, the cryptographic module performs the transaction (as shown by 86) and then sends a new challenge to the client software, for the next round of authentication.

In one embodiment, the checkpoint concept operates in the following manner. Each module retains in its memory records relating to the three most recent transactions that modified a PSD package. For example, these records include the following data items:

PSD meter ID
Transaction type
Transaction amount
PSD AR value
PSD DR value
Module serial number
Date/time stamp (for record replay detection)
Module total amount reset
Module total amount printed
Module total amount refunded The record of the most recent transaction is also output to the database and is protected from modification by a DES MAC generated using the key HMK_chkpt. When a PSD transaction is to be performed, the checkpoint record from the database is input along with the PSD package for the meter. Preferably, all IBIP commands to the modules are handled by the function sdx_dispatch. Within dispatch, the checkpoint record from the database is compared with the most recent checkpoint record stored in the module memory. If they match, it is highly likely that no switchover of the database (resulting in lost records) has occurred. The module then trusts that the PSD package is up to date and allows the IBIP command to be executed. When the IBIP command is completed, the checkpoint record is updated and output to the server for database storage along with the updated PSD package.

In the case of create indicium commands, the server first confirms that the updated records have been stored on the database before the indicium is transmitted to the client for printing. (Server transaction logs keep a record of all messages sent to clients.) In the case of the provider commanding postage value download or create refund indicium, the server reports an error if the database fails to correctly store the updated checkpoint record and PSD package.

If the comparison of internal and external checkpoint records does not match, the module will not execute the IBIP command and an error code is returned to the server. The server then sends a command called "Auto-Recover module Checkpoint" to the module. This command allows a controlled rollback to an older checkpoint if the external checkpoint record matches either of the two older checkpoint records stored in the module internal memory. The module updates its internal records using data from the accepted checkpoint and outputs audit log records to document the more recent PSD transactions that are to be discarded (transactions more recent than the accepted checkpoint). If none of the module's internal checkpoint records match the record input from the database, auto-recovery fails and an error is returned to the server. This module is now effectively inhibited from processing PSD packages and operator intervention, using the disaster recovery process, is needed to return it to operation.

In summary, the checkpoint validation and auto-recovery processes allows the module to verify that the database providing records is up to date and to automatically re-synchronize the module with the database if possible.

The next level of security is achieved by encrypting all communications between the client and the Postal Server subsystem. The encryption-decryption function is employed using an encryption algorithm, for example, RSA public key encryption algorithm. The client has a unique public and private key pair generated by the Postal Server subsystem that is embedded in the client software and these keys are used for encrypting/decrypting communications between the client and the Postal Server subsystem.

The user secret key (HMK) is further encrypted by using the public key of the cryptographic module 52 shown in FIGS. 3 and 6. HMK gets encrypted with its PSD encryption keys (3DES) by the cryptographic module 52. Then, the encrypted HMK is stored in the Database subsystem 51 along with other PSD information. In one embodiment, the cryptographic module 52 is embedded in the hardware where Postal Server 41 is running. The Postal. Server 41 is connected to the Public Network 73. The cryptographic module 52 is used to decrypt the encrypted secret key of the user that is stored in the Database subsystem. The user authenticates itself with every request by digitally signing every request using the secret HMK. The cryptographic module 52 verifies the user signature using its copy of HMK stored in the Database subsystem 51.

The interaction between the cryptographic modules and the Database subsystem provides two more levels of security. The first level of security is the cryptographic module verifying last transactions with the Database subsystem and the second level of security is the cryptographic protection of internal storage registers in the cryptographic modules. In one embodiment, the cryptographic modules store up to five transactions in a respective internal register. The number of transactions compared in the verification process system may be set by the system administrator. A verification process compares a predetermined number of last transactions. The database subsystem stores a table that preferably includes the cryptographic module(s) present in the Postal Server subsystem 41, the cryptographic module serial numbers, the time of the last transaction the cryptographic module processed, the date of the last transaction the cryptographic module processed and the value of the last transaction the cryptographic module processed. Other values related to a transaction and a cryptographic module can also be saved for verification purposes. An example of the cryptographic module table, where the Postal Server subsystem has four cryptographic modules, is illustrated below.

| Cryptographic module | Cryptographic module Serial. # | Transaction Time | Transaction Date | Transaction Value |
|---|---|---|---|---|
| 1 | 34576590 | 11:53 PM | Aug. 06, 1999 | $0.33 |
| 2 | 34582152 | 07:30 AM | Aug. 05, 1999 | $7.55 |
| 3 | 34593104 | 03:00 PM | Aug. 02, 1999 | $3.45 |
| 4 | 34593992 | 11:22 AM | Aug. 03, 1999 | $5.78 |

When a cryptographic module 52 loads a new PSD out of the Database subsystem 51 (performing a transaction), the cryptographic module's register, containing the last transaction's time, date and value, is verified against that cryptographic module's entry in the Database subsystem's cryptographic module table. The time, date or value for each transaction stored in each cryptographic module should match the corresponding values for the respective cryptographic module stored in the database for the verification process to be successfully completed.

Cryptographic modules do not load new PSD transactions unless the verification process has been successfully completed. If any of the compared values is found to be different, preferably the whole system shuts down until authorized personnel can investigate the situation. In one embodiment, the threshold in the system is adjustable so that the system may be set to shut down if one, two or more cryptographic modules fail the verification process. The registers of each cryptographic module are cryptographically protected against any unauthorized access of the database. This provides another level of security.

Additionally, the Database subsystem for the on-line VBI system is designed to allow for easy recovery from minor or major failures. A dual redundancy (backup) database server is connected to the on-line VBI system to mitigate the damage caused by the failure of the primary database server. In one embodiment, a backup database automatically carries all of the responsibilities of the primary Database server until the primary database server is repaired. Preferably, the Database subsystem is monitored 24 hours a day to immediately recognize problems.

In order to maintain data protection in case of media failure, software error (system crash), or power outage, a cryptographically protected transaction log on the primary database server is off-loaded to tape periodically throughout the day. The transaction log does not need to be a real time backup, but the number of transactions lost would be minimized since the backup occurs periodically throughout the day.

In addition, on a daily basis, the data in the Database subsystem is backed up to a backup system, such as a tape backup system, and stored off premises in a secure facility. After the daily backup is completed, a transaction log of the primary database server is backed up to a backup system, such as a tape drive, and stored off premises in a secure facility with the data backup of the database subsystem.

Minor failures of the primary database subsystem, for example media failure, power outages and software error, are easily handled in the on-line VBI system. In one embodiment, to change from the backup Database server in the case of the failure of the primary database server, the system administrator changes the IP address to that of the backup database server and makes the primary database server the backup database server. Next, the system administrator resets the database server and loads the latest encrypted transaction log. The system administrator uses a cryptographic module to decrypt the transaction log and the decrypted information from the transaction log is loaded into the Database subsystem.

In the case of catastrophic failure, e.g. loss of the database and the cryptographic modules, as long as the transaction log and daily backups are stored off premises, the data can be recovered. The data is recovered by storing a cryptographic module in an off-site secure location close to the stored transaction logs, daily backups and backup on-line VBI system. The backup of the system is combined with the transaction log to reinstate all of the accounts contained in the transaction log.

In one embodiment of the invention, the daily backups and the transaction logs are downloaded to a tape. If a catastrophic failure occurs, then the latest daily backup tape is loaded onto the backup on-line VBI system. Next, the cryptographic module decrypts the backup tape and the decrypted information from the backup tape is loaded into the Database subsystem. Then, the cryptographic module decrypts the transaction log and the decrypted information from the transaction log is loaded into the Database subsystem.

Preferably, the verification process that the cryptographic module performs with the cryptographic module table in the Database subsystem is not performed, because the new cryptographic module does not have any record of previous transactions, since it was sitting in a vault off premises from the on-line VBI system. The transaction log is cryptographically protected so that unauthorized personnel cannot manipulate the data.

The cryptographic module is able to trust the cryptographically protected data of the transaction log because cryptographic module has knowledge of the format of the transaction log. As a result, the entire database is recovered and recreated by at least one cryptographic module using the last transaction log and the backup data.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A secure on-line system for printing value bearing items (VBI) comprising:

a client system configured to interface with a plurality of users; and a server system configured to communicate with the client system over a communication network comprising:

a secure database remote from the users including a data record for each of the users; and a plurality of stateless cryptographic devices, each of the plurality of stateless cryptographic devices remote from the plurality of users and configured to perform authentication, processing value for the VBI, and generation of indicia data for the plurality of users, wherein before each of the authentication, processing value, and generation of indicia data for a given user is performed, an available cryptographic device in the server system retrieves the data record for the given user directly from the database, and wherein after the authentication, processing value, and generation of indicia data are performed, the client system instructs a printer to print the VBI.

2. The secure on-line system of claim 1, further comprising computer executable code for an asynchronous dynamic password verification to terminate a user session if the password authentication fails.

3. The secure on-line system of claim 1, wherein the database stores a first set of one or more last database transactions and each of the cryptographic devices stores a second set of one or more last database transactions for comparison with the first set of one or more last database transactions stored in the database to verify each database transaction.

4. The secure on-line system of claim 3, wherein each of the cryptographic devices prevents further database transactions if the second set of one or more last transaction stored in the cryptographic device does not match with the first set of one or more last transaction stored in the database.

5. The secure on-line system of claim 3, wherein the database stores a table including the respective information about a last transaction and a verification module to compare the information saved in the module with the information saved in the database.

6. The secure on-line system of claim 1, further comprising a back up database server connected to the server system for periodically backing up the data stored in the database in a back up database.

7. The secure on-line system of claim 6, further comprising a cryptographically protected transaction log stored in the back up database.

8. The secure on-line system of claim 1, wherein each of the cryptographic devices includes a data validation subsystem to verify that data is up to date and an auto-recovery subsystem for allowing the device to automatically re-synchronize the device with the data.

9. The secure on-line system of claim 1, wherein each of the cryptographic devices includes a computer executable code for detecting errors and preventing a compromise of data or critical cryptographic security parameters as a result of the errors.

10. The secure on-line system of claim 1, wherein the server system further comprises one or more of a postal server subsystem, a provider server subsystem, an e-commerce subsystem, a staging subsystem, a client support subsystem, a decision support subsystem, a SMTP subsystem, an address matching service subsystem, a SSL proxy server subsystem, and a web server subsystem.

11. A method for securely printing value-bearing items (VBI) via a communication network including a client system, and a server system including a plurality of stateless cryptographic devices, the method comprising the steps of:

interfacing with a plurality of users remote from the plurality of stateless cryptographic devices, via the client system;

communicating with the client system over the communication network;

storing a data record for each of the plurality of users in a database remote from the plurality of users;

directly retrieving the data record for a given user from the database;

authenticating the given user, processing value for the VBI and generating indicia data for the given user, by any available cryptographic device of the plurality of stateless cryptographic devices; and printing the VBI by the client system.

12. The method of claim 11, further comprising the step of encrypting each database transaction.

13. The method of claim 11, further comprising the steps of storing one or more last database transactions in the database;

storing one or more last database transactions in the cryptographic device; and comparing the one or more last database transactions stored in the database with the one or more last database transactions stored in the available cryptographic device to verify each database transaction.

14. The method of claim 11, further comprising the steps of storing one or more last database transactions in the database, storing one or more last database transactions in the available cryptographic device for comparison with the one or more last database transactions stored in the database to verify each database transaction.

15. The method of claim 14, further comprising the step of preventing further database transactions if the one or more last transaction stored in the cryptographic device does not match with the one or more last transaction stored in the database.

16. The method of claim 11, further comprising the step of storing a table including the respective information about a last transaction and comparing the information saved in the available cryptographic device with the information saved in the database.

17. The method of claim 11, further comprising the step of backing up data stored in the database in a back up database.

18. The method of claim 17, further comprising the step of recovering data from the back up database by decrypting an encrypted transaction log stored in the back up database.

* * * * *